April 14, 1964  W. A. JUERGENS  3,128,479
MOUNTING CLIP HAVING ATTACHMENT LIP
Filed Nov. 17, 1961
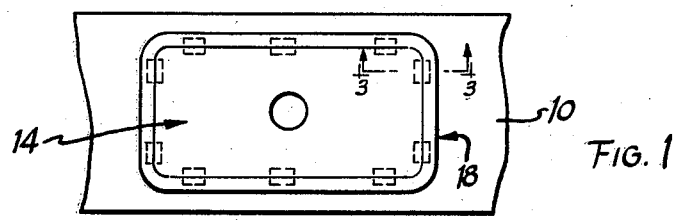
FIG. 1
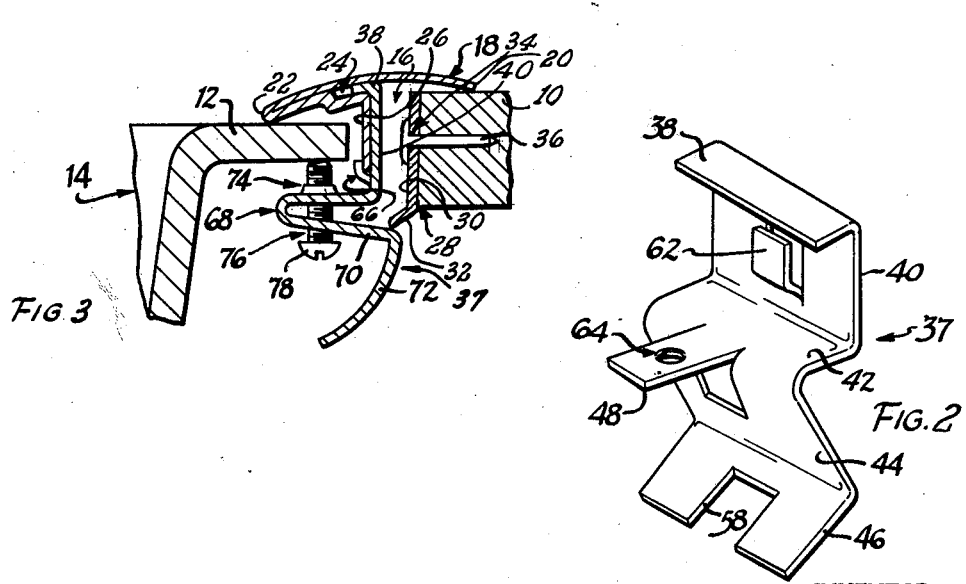
INVENTOR.
WILLIAM A. JUERGENS
BY
WILSON, SETTLE & CRAIG
ATTORNEYS

United States Patent Office 3,128,479
Patented Apr. 14, 1964

3,128,479
MOUNTING CLIP HAVING ATTACHMENT LIP
William A. Juergens, Harper Woods, Mich., assignor to Juergens Manufacturing Company, Inc., Southfield, Mich., a corporation of Michigan
Filed Nov. 17, 1961, Ser. No. 153,152
5 Claims. (Cl. 4—187)

This invention relates broadly to the mounting of peripherally flanged appliances in countertops, and more particularly to an improved mounting for peripherally flanged appliances wherein installation of the appliance in a cut out opening in a countertop is substantially entirely effected from the "top side," the installation is greatly accelerated as contrasted to prior art installations of a similar nature, and wherein provision is made for simply and quickly removing the appliance from such mounting when desired.

It is accordingly an important object of the present invention to provide a novel mounting clip for flanged appliances, the clip having a lip, facilitating installation.

Another object is to provide a mounting clip for flanged appliances that provides for factory assembly of mounting rim and mounting clips and wherein a lip provision is made for positive retention of the mounting clips against accidental dislodgement during shipping or handling in the interval between factory assembly and situs of installation.

This application is a continuation-in-part of my copending application Serial No. 61,747, filed October 10, 1960, now Patent 3,080,569, dated March 12, 1963.

Other objects of this invention will appear in the following description and appended claims, reference being had to the accompanying drawings forming a part of this specification wherein like reference characters designate corresponding parts in the several views.

In the drawings:

FIGURE 1 is a top plan view of a flanged sink mounted in a countertop in accordance with the present invention;

FIGURE 2 is a perspective view of one embodiment of the mounting clip of the present invention; and FIGURE 3 is a sectional view of a second embodiment of the invention as along line 3—3 of FIGURE 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The Environment

As shown in FIGURE 1, a peripherally flanged appliance such as a kitchen sink, bathroom sink, or the like, is mounted in a countertop 10. The countertop 10 typically comprises ¾ inch plywood covered with a thin layer of heat and liquid resistant synthetic resin, as for example a thermo-setting phenolic resin, and the countertop is provided with a cutout or opening. When mounting an appliance of the non self-rimming type, as shown in FIGURES 1, 2 and 3, the perimeter of the opening is slightly larger than the perimeter of the flange 12 of the appliance 14. Thus a space 16 is provided between the edge of the rim 12 of the appliance 14 and the edge of the hole in the countertop 10, FIGURE 3, which is bridged by a rim element 18 that extends completely around the periphery of the appliance, and as will be subsequently described, is so connected between the appliance and the countertop as to lock the appliance in place in fluid sealed relationship thereto. It should be pointed out that the rim element 18 is made of strip stock, such as stainless steel, formed into a loop with the ends joined as by a polished butt weld to make it endless and thus provide an installation finished off in a workmanlike manner.

With reference to the invention as shown in FIGURES 2 and 3, wherein the separate rim element 18 is utilized in mounting a non self-rimming appliance, the rim element 18 is of generally T-shaped cross section, with an upper, generally horizontal arcuate wall portion 20 having a reversely turned sub-wall 22 formed along one edge thereof. It will be noted that the reversely turned sub-wall is stepped to provide a gap 24 for receiving a topmost securing lip 38 of an attachment bracket 37 of the invention, to be subsequently described. Also, the rim element 18 includes a stiffener wall or flange 26 that is generally vertically disposed with respect to the arcuate top 20.

As shown in FIGURE 1, the rim element 18 is formed to extend all around the periphery of the appliance rim 12 with the stiffener wall or flange 26 fitting between the periphery of the appliance and the larger periphery of the opening in the countertop 10.

It is upon the foregoing environment that the present invention is superimposed, and a detailed description now follows.

The mounting means of the present invention includes retaining strips 28 having an elongated wall or plate portion 30. An outwardly turned cam rim 32 is formed along the bottom edge of the strip 28. The wall or plate portion 30 is apertured as at 34 and nails or screws 36 are passed therethrough into the countertop for securing the strip 28 in position. In mounting the average appliance retainer strips 28 are fastened along the sides and ends for cooperation with the clips of invention now to be described.

The Novel Clips

In the first embodiment of the invention, FIGURE 2, the clip includes, starting at the top, an overturned lip 38 adapted to fit snugly in the gap 24 between elements 20 and 22 of rim 18. The lip 38 is joined to a perpendicularly related or vertically extending wall 40 bent at the bottom to extend horizontally and provide a support ledge 42 that reverses angularly downwardly from left to right in FIGURE 2, as a spring arm detent cam 44 that again reverses steeply downwardly and to the left as a spring detent actuating cam arm 46.

A horizontal tab 48 is struck from the metal of the support ledge 42. The horizontal tab 48 is apertured as at 64 and threaded to receive a bolt, such as 78, FIGURE 3. It will be noted that the upper end of the bolt 78 engages the underneath side of the flange 12 of the appliance.

The spring detent actuating cam arm 46 is cut away as at 58 in alignment with and beneath the aperture 64 for threading a bolt upwardly in assembling the clip 37 to the flange 12 and rim 18.

FIGURE 3 shows the assembled relation of the parts, that is the mounting of the appliance 14 by its flange 12 to the rim 18 and the clips 37 holding these two elements together. This view also shows the appliance mounted in the countertop with the spring arm detent 44, 72 of the clip 37 retained beneath the cam lip 32 of the retainer strip 28 to hold the appliance in position. Now let us visualize the manner in which this assembly was very conveniently and expeditiously completed, working only from the top of the countertop 10, as viewed in FIGURE 1. The complete assembly in approximately 7 minutes time is as follows:

(1) After the cutout is made in the countertop 10, the retaining strips 28 are nailed in position, one at each end and one along each side of the cutout. This takes approximately 2 minutes.

(2) The rim is placed upside down on top of the cabinet and the appliance is dropped in place therein, with the flange 12 of the appliance 14 bounded by the stiffener wall 26 of the rim 18. The clips 37 are next attached by inserting the lip 38 in the gap 24 of rim 18 and turning up the bolt 78 to engage the underside of the flange 12 of the appliance 14. Installation of approximately 10 clips, as illustrated in FIGURE 1 takes approximately 4 minutes, making a total elapsed time to this point of 6 minutes.

(3) The outside of the frame is then caulked and the sink rim and clip assembly is turned over and snapped into place. This operation takes 1 minute. The job is all done in 7 minutes.

Explanation of the last step is as follows:

When the appliance is inverted and dropped into the opening of the countertop, the spring detent actuating cam arms 46, 72 engage the upper surface of the cam rim or lip 32 of retaining strip 28, springing inwardly to pass the lip 32 and locking under as shown in FIGURE 3. Thus, absolutely no under-the-counter manipulations are required in making the assembly in accordance with the present invention.

However, if it is ever necessary or desirable to remove the appliance at any subsequent time, this is also provided in the present invention by merely loosening the bolts 78 around three sides of the appliance; this permits the spring detent actuating cam arms 46, 72 of the clips 37 along those three sides of the appliance to drop inwardly and clear the cam rim or lip 32 to permit the appliance to be lifted out of its opening.

It will be obvious from the foregoing that the rim and clips can be attached to the appliance at the factory and thus all that a workman need do is apply the retaining strips 28 at the site, caulk the outside of the rim 18, turn the sink 14 over and snap it in place—thus the job is all finished in no more than about 1 to 2 minutes at the site. Further, all the installation is done from topside. The reduction in labor costs for installation in accordance with the present invention are thus outstandingly demonstrated.

As shown in FIGURE 2, the wall 40 of the clip 37 is provided medially with an angularly upturned and offset lip 62, that is adapted to embrace the bottom edge of stiffener wall or flange 26 of the mounting rim 18, see FIGURE 3. This lip 62 prevents dislodging the clip 37 from assembled relationship with the flange 12 of the appliance and the rim 18, as when the appliance is flanged and clipped at the factory for shipment to the site so that application merely requires propping the unit into position after caulking.

As regards the substantial length of the lip 62 of the FIGURE 2 showing, it will be noted that application of this embodiment to the stiffener wall 26 of the rim 18 generally requires that the stiffener wall 26 be opened at each of its ends and thus be made in four segments, one along each side and one along each of the ends of the rim.

The Embodiment of FIGURE 3

As shown in FIGURE 3, a further refinement can be made to the present invention by extending the ledge 42 of the previous embodiment further outwardly from wall 40 as at 68 and reversing to form a spring arm detent cam 70 and then folding downwardly to form a spring detent actuating cam arm 72 equivalent to the element 46 of FIGURE 2. The ledge 68 is apertured by dimpling and threading as at 74 and in coaxial alignment therewith, there is provided an enlarged aperture 76 through which a bolt 78 can be passed from the bottomside, with clearance, into the dimpled and threaded aperture 74 to provide connection between appliance 14 and frame 18. Also, this embodiment of the invention is provided with an upturned and offset lip 66 similar to FIGURE 2.

However, at this point, a further refinement of the invention is evidenced. As described with respect to the embodiment of FIGURE 2, the extended length of the upturned and offset lip 62 usually requires that the wall portion 26 of the rim 18 be severed at the corners of the rim to provide access for applying the clip 37. Although it is possible to apply the embodiment of FIGURE 2 to a rim where the stiffener wall 26 is continuous, by forcibly springing the tab 62 to permit the lip 38 to be inserted in the slot 24, a more expeditious way of making application without distorting the unit is to foreshorten the lip 62 as at 66 in FIGURE 5 so that ready application of the bracket can be made to wall 26 of rim 18 even when the stiffener wall 26 is continuous. In practice, it has been found that a tap of about 1/32 inch length configuration makes it possible to "twist" or pop the clip into position at any point along the stiffener wall 26, obviating the necessity of slipping it over an open end of the stiffener wall or forcibly springing the lip 62.

However, as described for the embodiment of FIGURE 2, this tiny lip 66 is fully effective in providing a factory rimmed appliance without danger of the clip being displaced as previously mentioned.

Thus, by the embodiments of FIGURES 2 and 3, a substantial advantage is evidenced to the present invention.

Also, the spring detent actuating cam arm 72 is notched, similar to 58 in FIGURE 2, for passage of the head of the bolt 78 and a screw driver blade, for adjustment.

The same advantages of invention are inherent in this embodiment as in the previously described embodiments, and additionally the unit is strengthened by the additional metal in the ledge 68 and further by the retained metal of dimpled opening 74 to perform the important function of providing a threaded wall. Also, the camming action of the spring arm 70 and spring detent actuating cam arm 72 is improved because of the greater length of the spring arm detent 70. This provides slightly improved insertion action of the flanged appliance into its final assembled relationship in the aperture of the countertop 10.

General Explanation

As regards FIGURE 3, it is noted that a slight gap exists between the top of the appliance flange and the step portion of the sub-wall 22. Thus, it might appear from a casual inspection of these two views of the drawings that the frame-clip assembly would have a tendency to collapse downwardly around the contact line where the sub-wall 22 of the rim 18 contacts the top surface of the appliance flange. However, this is not the case because the stiffness and continuity of the frame-like rim prevents such an action. Thus, the rim must be visualized as an endless unit with substantial rigidity because of corner connections and integrity preventing buckling of the type indicated.

In the FIGURE 3 installed position, each spring arm detent 70 is slightly deformed from its free state condition so as to provide a force downwardly at the periphery of the flange, that is where the periphery of the flange contacts the countertop, to provide a force for a fluid proof seal when caulking or other plastic sealing compound is utilized. Thus a very effective seal action is provided by the present invention. Also, the stressed condition of the spring detent portion of the clip of the invention effectively prevents any upward displacement or looseness from developing between the sink rim assembly relative to the countertop over a very long period of usefulness.

Extended Scope of Invention

While bolts having threaded bodies have been described with regard to the previously described embodiments of the invention, it will be understood that they can be replaced by slidable shims to perform the same function of holding the clip to the rim, or, rotary cams could be utilized to perform this function instead of a slidable shim.

Although the foregoing description has illustratively related to the mounting of a flanged sink as typified by an ordinary kitchen sink in a countertop, the broad scope of the invention includes application of all types of rimmed appliances into a suitable mounting. Thus, bathroom sinks of the type shown, flanged stove tops of both the gas and electric variety, and bathtubs on the order of a large kitchen sink having flanges extending all the way around are to be included as being applied by the clip principle of the present invention and utilizing topside installation.

While the various views of the drawings show the cam surface of the spring arm detent being positioned behind the backside of the vertical wall beneath the top lip, this is not limiting and the broad scope of the invention includes this cam surface being positioned on either side of the vertical wall. The relative position of the cam surface is dependent upon the lip 32 of the retainer strip 30, FIGURE 1.

Having thus described my invention, I claim:

1. In a fastening clip, a wall having first and second spaced edges, and first and second face surfaces, a lip formed along said first edge, a support ledge formed along said second edge, said lip and edge extending away from said first face, said ledge being doubled back to form a spring arm detent terminating in a cam surface positioned beyond said second face of said wall, an aperture in said support ledge, an access opening in said spring arm detent in alignment with said aperture, and an offset lip extending outwardly from said first face of said wall and extending toward said first edge.

2. In a fastening clip, a wall having first and second spaced edges and first and second face surfaces, a lip formed along said first edge, a support ledge formed along said second edge, said lip and ledge extending away from said first face, said ledge being doubled back to form a spring arm detent terminating beyond said second face of said wall, said spring arm detent being reversely turned to form a spring arm detent actuating arm terminating beneath said spring arm detent, a tab struck out of the material of said support ledge of said spring arm detent, a threaded aperture in said tab, access openings in said spring arm detent and said spring arm detent actuating arm in alignment with said aperture, and an offset lip extending out from said first face of said wall and opening toward said first edge.

3. In a fastening clip system,
a wall having first and second spaced edges and first and second face surfaces,
a lip formed along said first edge,
a support ledge formed along said second edge,
said lip and ledge extending away from said first face,
said ledge being doubled back to form a spring arm detent terminating in a cam surface positioned generally beneath said wall,
an aperture in said support ledge, the material surrounding said aperture being axially displaced to provide a threadable tube-like body of substantial material for receiving a threaded fastening element,
an access opening in said spring arm detent in alignment with said aperture,
an offset lip extending outwardly from said first face of said wall and projecting toward said first edge,
and a threaded fastening body inserted through said aperture toward said lip.

4. In a fastening clip,
a wall having first and second spaced edges and first and second face surfaces,
a lip formed along said first edge,
a support ledge formed along said second edge,
said lip and ledge extending away from said first face,
said ledge being doubled back to form a generally U-shaped spring arm detent underlying said support ledge and terminating in a cam surface extending beyond said second face of said wall,
said cam surface being reversely turned to form a spring arm detent actuating arm terminating beneath said spring arm detent,
a threaded aperture in said support ledge,
access openings in said spring arm detent and said spring arm detent actuating arm in alignment with said aperture,
and an offset lip extending outwardly from said first face of said wall and extending toward said first edge thereof.

5. In a fastening clip, a generally flat wall having first and second spaced edges and first and second face surfaces, a first lip formed along said first edge, a ledge formed along said second edge generally parallel to said lip and extending in the same direction, said lip and ledge extending away from said first face, said ledge having an aperture therein to receive a threaded fastening body inserted through said aperture toward said lip, and a second offset lip extending diagonally outwardly from said first face of said wall and then projecting toward said first edge.

References Cited in the file of this patent

UNITED STATES PATENTS

| | | |
|---|---|---|
| 1,077,099 | Shafer | Oct. 28, 1913 |
| 2,345,004 | Place | Mar. 28, 1944 |
| 2,790,181 | McCarthy | Apr. 30, 1957 |
| 2,877,468 | Lawson | Mar. 17, 1959 |
| 2,885,691 | Juergens | May 12, 1959 |
| 2,992,436 | Camp | July 18, 1961 |